(12) United States Patent
Coxon

(10) Patent No.: US 7,861,613 B2
(45) Date of Patent: Jan. 4, 2011

(54) SELECTOR MECHANISM FOR DUAL-CLUTCH TRANSMISSIONS

(75) Inventor: David John Coxon, Portage, MI (US)

(73) Assignee: Eaton Corporation, Cleveland, OH (US)

( * ) Notice: Subject to any disclaimer, the term of this patent is extended or adjusted under 35 U.S.C. 154(b) by 931 days.

(21) Appl. No.: 11/787,739

(22) Filed: Apr. 17, 2007

(65) Prior Publication Data

US 2008/0257084 A1    Oct. 23, 2008

(51) Int. Cl.
*F16H 63/30* (2006.01)
(52) U.S. Cl. ................. 74/335; 74/473.1; 74/473.36
(58) Field of Classification Search .............. 74/335, 74/473.1, 473.12, 473.36
See application file for complete search history.

(56) References Cited

U.S. PATENT DOCUMENTS

| | | | |
|---|---|---|---|
| 4,722,237 A | 2/1988 | McNinch, Jr. | |
| 4,873,881 A | 10/1989 | Edelen et al. | |
| 4,920,813 A | 5/1990 | Willford | |
| 5,281,901 A | 1/1994 | Yardley et al. | |
| 5,408,898 A | 4/1995 | Steeby et al. | |
| 5,560,249 A | 10/1996 | Nellums | |
| 5,590,563 A | 1/1997 | Kuwahata et al. | |
| 5,950,781 A | 9/1999 | Adamis et al. | |
| 6,000,294 A | 12/1999 | Jackson et al. | |
| 6,003,649 A | 12/1999 | Fischer et al. | |
| 6,044,719 A | 4/2000 | Reed, Jr. et al. | |
| 6,123,643 A | 9/2000 | Davis et al. | |
| 6,227,067 B1 | 5/2001 | Steeby et al. | |
| 6,286,381 B1 | 9/2001 | Reed, Jr. et al. | |
| 6,389,919 B1 | 5/2002 | Hennequet et al. | |
| 6,634,247 B2 | 10/2003 | Pels et al. | |
| 6,698,304 B2 | 3/2004 | Gierling et al. | |
| 6,851,326 B2 | 2/2005 | Wild et al. | |
| 6,856,880 B2 | 2/2005 | Shimaguchi et al. | |
| 6,874,381 B2 | 4/2005 | Berger et al. | |
| 7,313,979 B2 * | 1/2008 | Ehrlich et al. ................. 74/335 |
| 7,694,605 B2 * | 4/2010 | Fujimoto et al. ......... 74/473.36 |
| 2002/0088288 A1 | 7/2002 | Bowen | |
| 2003/0226416 A1 | 12/2003 | Umemoto et al. | |
| 2004/0182187 A1 | 9/2004 | Katakura | |
| 2005/0040783 A1 | 2/2005 | Hemphill et al. | |
| 2006/0005648 A1 * | 1/2006 | Ehrlich et al. ................. 74/335 |
| 2006/0150761 A1 * | 7/2006 | Beer et al. ..................... 74/335 |
| 2008/0210034 A1 * | 9/2008 | Murakami et al. ............. 74/335 |
| 2008/0302199 A1 * | 12/2008 | Shintani et al. ........... 74/473.12 |
| 2009/0038423 A1 * | 2/2009 | Shintani ....................... 74/335 |
| 2009/0320635 A1 * | 12/2009 | Terada et al. ............. 74/473.36 |

* cited by examiner

*Primary Examiner*—Sherry Estremsky
(74) *Attorney, Agent, or Firm*—Rader, Fishman & Grauer PLLC

(57) ABSTRACT

An embodiment provides a method shifting a multispeed transmission. The multispeed transmission includes multiple gear paths having alternating speed ratios and a plurality of shift members. Each shift member is selectively moveable to engage a speed ratio of the transmission. The method includes directing a shift finger to contact a first shift member, moving the first shift member generally in a first generally orthogonal direction to engage a first gear, and moving the shift finger in a second generally orthogonal direction to an intermediate configuration. The shift finger will not contact a selector rail when moved in the first direction when the shift finger is in the intermediate configuration. The method also includes moving the shift finger generally in the second generally orthogonal direction to a second engaged configuration. The shift finger will contact a second shift member when moved in the first direction when the shift finger is in the second engaged configuration.

18 Claims, 9 Drawing Sheets

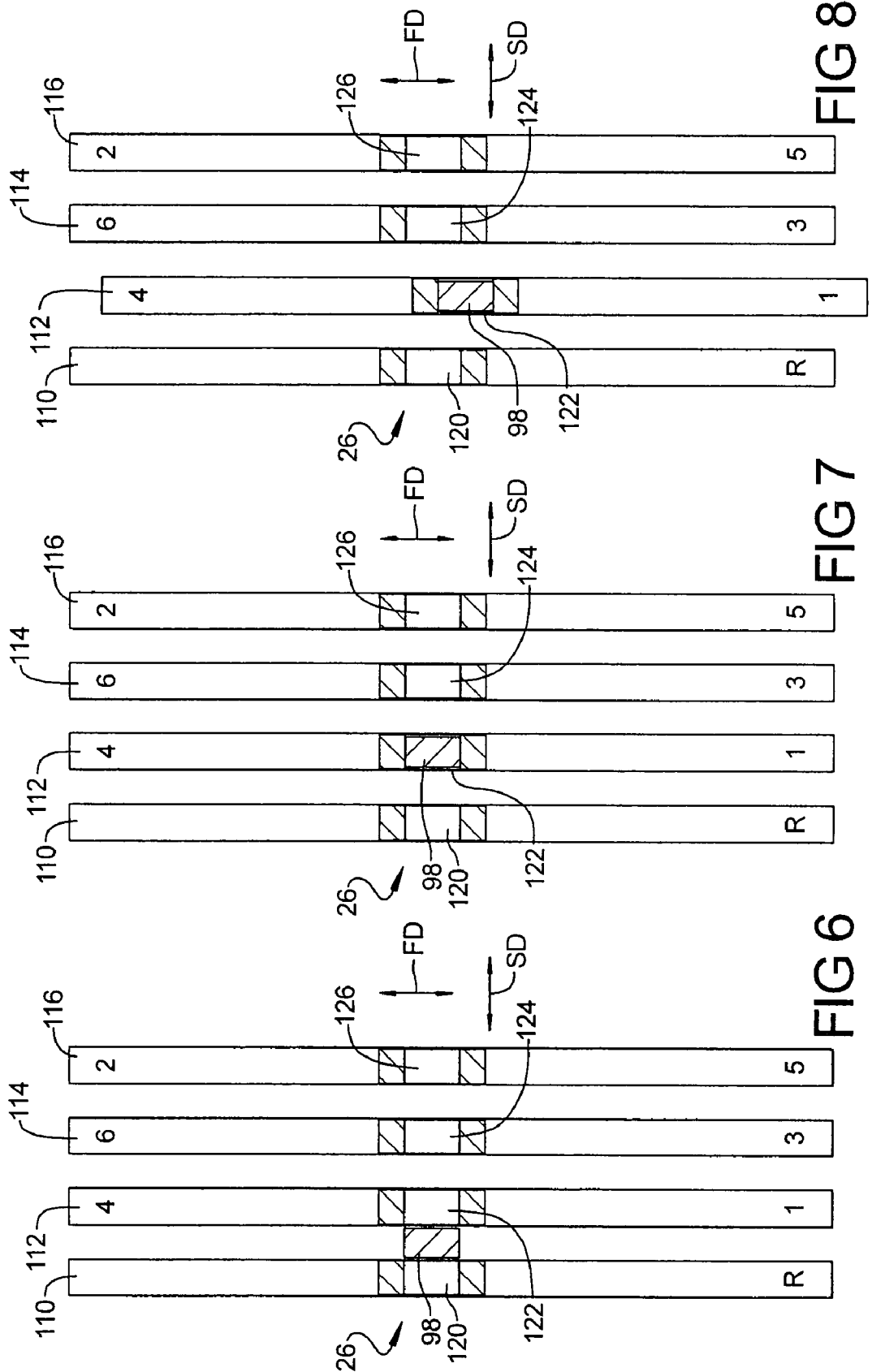

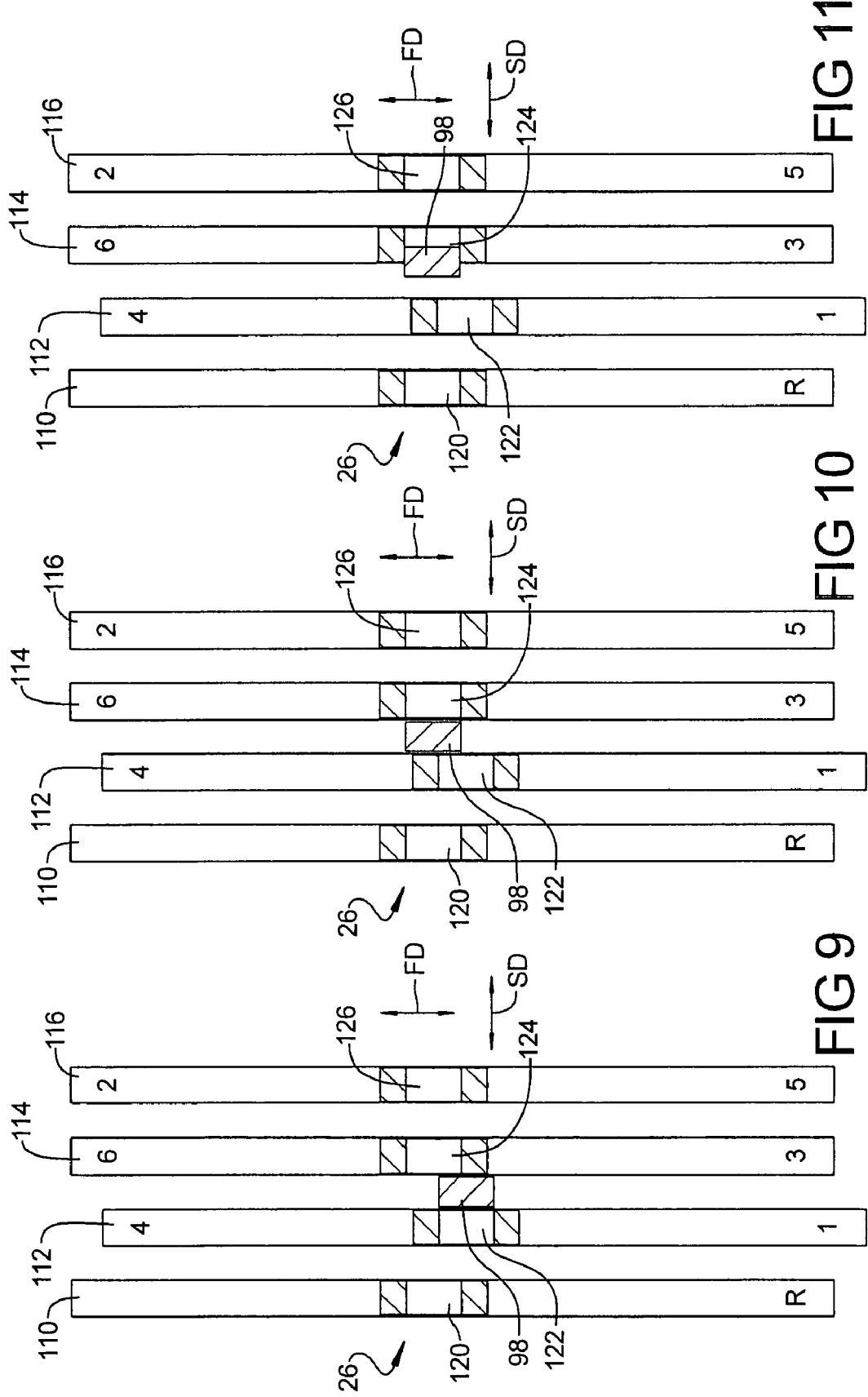

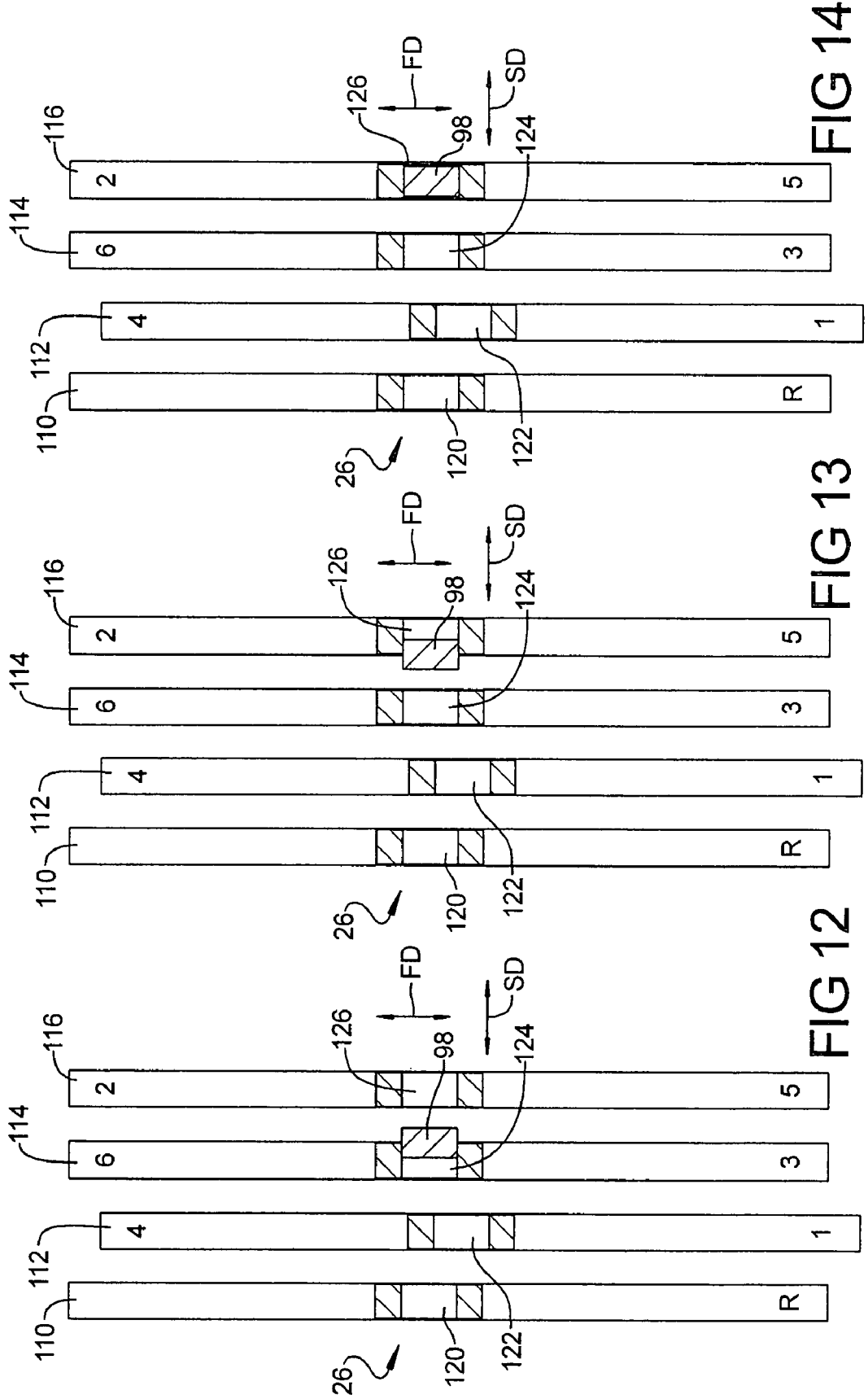

SELECTOR MECHANISM FOR DUAL-CLUTCH TRANSMISSIONS

TECHNICAL FIELD

The technical field is shifting mechanisms for dual clutch transmissions.

BACKGROUND

Twin-clutch, twin-shaft, dual shaft, or dual clutch transmissions of the alternating shifting type are well known in the prior art. Various types of twin clutch transmissions have been proposed and put into practical use, particularly in the field of wheeled motor vehicles. Traditional twin clutch transmissions are of a type in which gears are parted into two groups, each group having an individual main clutch, so that the operative condition of each group of gears is carried out by selectively engaging a corresponding main clutch. Twin clutch transmissions are used in vehicles to improve the transition from one gear ratio to another and, in doing so, improve the efficiency of the transmission. The gears of each group are typically individually engaged so as to rotatably connect a transmission input shaft to a transmission output shaft for transmitting torque at differing ratios. The differing ratios may be engaged by multiple shift clutches. A typical dual clutch is illustrated in commonly owned U.S. Pat. No. 7,082,850, to Hughes, the disclosure of which is hereby incorporated by reference in its entirety.

In such transmissions, the main section may be shifted by means of a shift control system. Typical shift control systems include multiple actuators for engaging and disengaging the multiple shift clutches. The actuators may be pneumatic, electric, or hydraulic, and typically, one double acting actuator controls each shift clutch. The shift control system may also include a control logic for controlling the engagement of the main clutches, and the shift clutches to provide a desired gear ratio during vehicle operation. Generally, one ratio for each group may be simultaneously engaged with only one main clutch engaged during vehicle operation. To complete a shift in a dual clutch transmission, the engaged main clutch is disengaged as the disengaged main clutch is engaged. Accordingly, the disengaged group may be reconfigured as the engaged shift clutch is disengaged while another shift clutch of the group is engaged to provide a higher or low gear ratio to complete the next main clutch disengage/engage process.

Typical non-dual clutch transmissions may be shifted by a single actuator acting as a X-Y shift control device. A X-Y shift control device may be operated by a manual lever or by a pneumatic, hydraulic, or electrical control. Prior X-Y shift control devices are disclosed in U.S. Pat. Nos. 4,873,881 and 5,281,902, to Edelen, U.S. Pat. No. 4,899,607 to Stainton, and U.S. Pat. No. 6,227,067 to Steeby, which are assigned to the assignee of the present application, the disclosures of which is hereby incorporated by reference.

BRIEF DESCRIPTION OF THE DRAWINGS

Referring now to the drawings, illustrative embodiments are shown in detail. Although the drawings represent some embodiments, the drawings are not necessarily to scale and certain features may be exaggerated, removed, or partially sectioned to better illustrate and explain the present invention. Further, the embodiments set forth herein are exemplary and are not intended to be exhaustive or otherwise limit or restrict the claims to the precise forms and configurations shown in the drawings and disclosed in the following detailed description.

FIGS. 6-16 are views similar to FIG. 5, with the shift members and shift finger in differing configurations.

DETAILED DESCRIPTION

Figure 1:
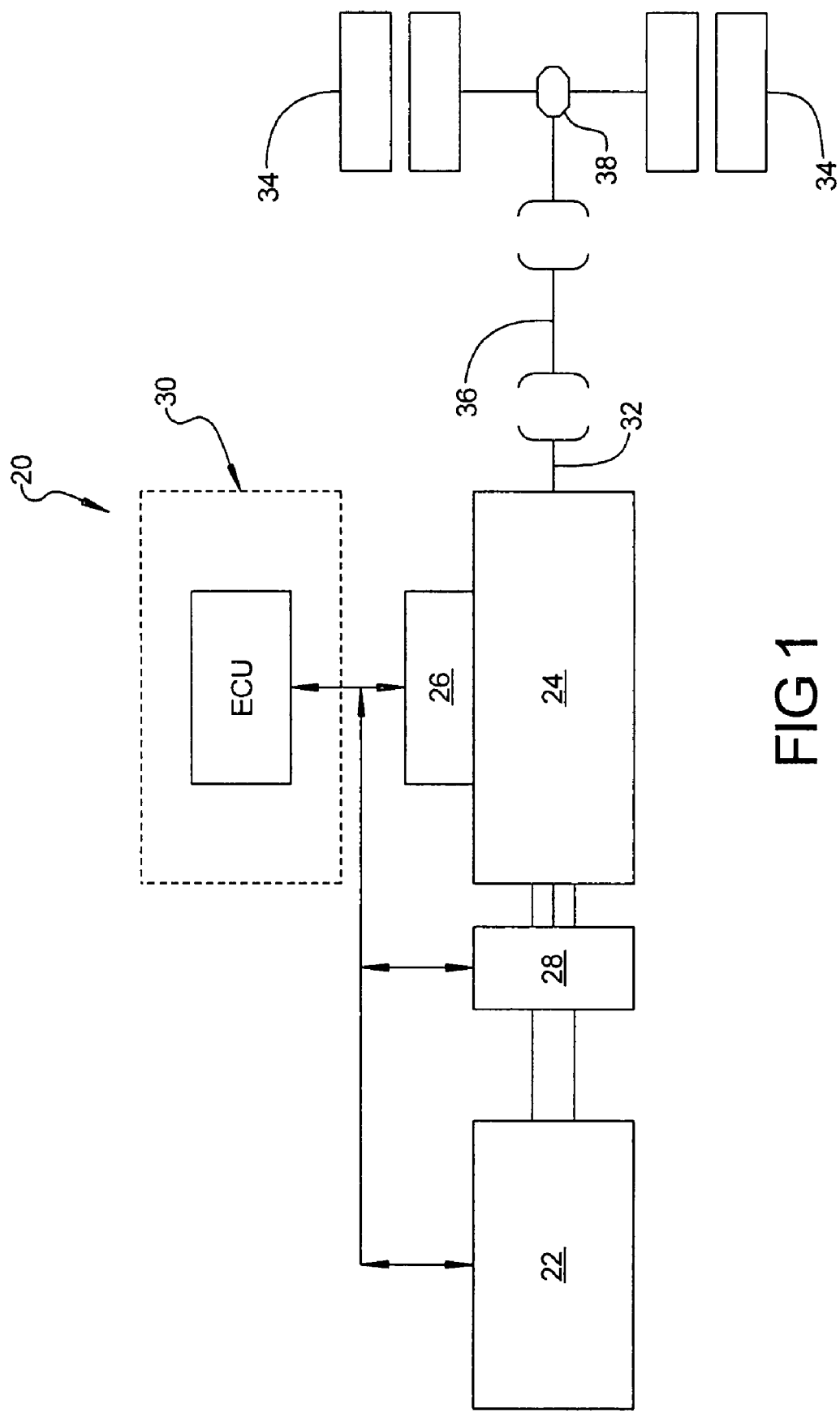
FIG. 1 is a schematic illustration, not to scale, of a powertrain system according to an embodiment.

Referring to FIG. 1, a powertrain system 20 is shown in accordance with an embodiment of the present invention. In the illustrated embodiment, powertrain system 20 includes a prime mover 22, such as a spark-ignited or compression-ignited internal combustion engine, and a transmission 24. A shift control system 26 operates to engage and disengage gear ratios within the transmission 24, as discussed in greater detail below. A main clutch assembly 28 is positioned between the prime mover 22 and transmission 24 to selectively engage/disengage the prime mover 22 from transmission 24.

In an embodiment, powertrain system 20 also includes an electronic control unit (ECU) 30 for controlling operation of the prime mover 22, main clutch assembly 28, and transmission 24. In an implementation of the invention, ECU 30 may include a programmable digital computer that is configured to receive various input signals, including without limitation, the operating speed of the prime mover 22, transmission input speed, selected transmission ratio, transmission output speed and vehicle speed, and processes these signals accordingly to logic rules to control operation of powertrain system 20. For example, ECU 30 may be programmed to deliver fuel to the prime mover 22 when the prime mover 22 functions as an internal combustion engine. To support this control, each of the prime mover 22, and main clutch assembly 28 may include its own control system (not shown) contained within ECU 30. However, it will be appreciated that the present invention is not limited to any particular type or configuration of ECU 30, or to any specific control logic for governing operation of powertrain system 20.

In the embodiment shown in FIG. 1, a transmission output rotation from an output shaft, or output member, 32 is distributed to wheels 34 through a drive shaft 36 and a differential 38.

Figure 2:
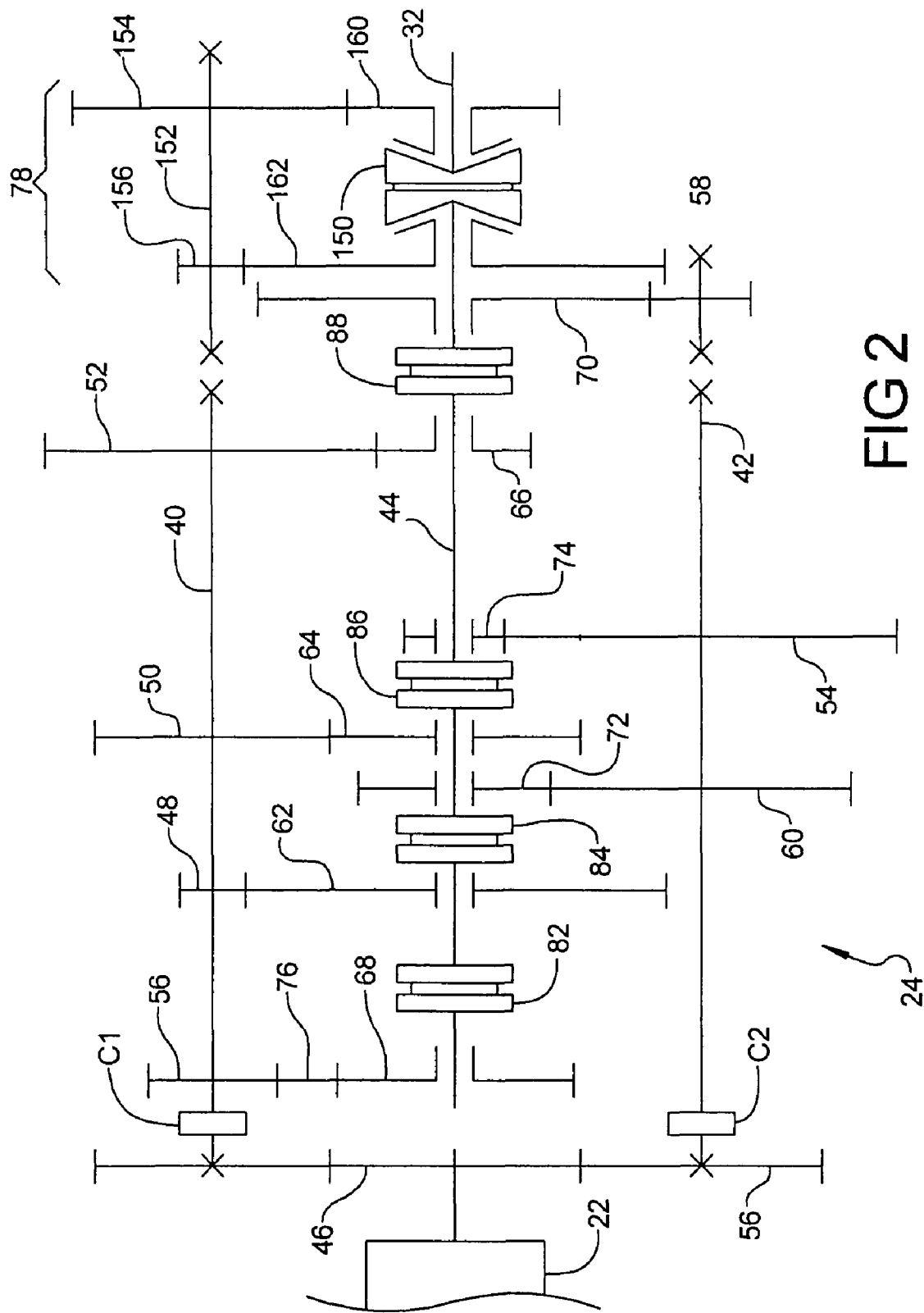
FIG. 2 is a schematic illustration of a transmission and dual clutch arrangement according to an embodiment

Referring to FIG. 2, an embodiment of a transmission and clutch arrangement for use in the powertrain system 20 is shown. In the illustrated embodiment, transmission 24 includes a first input shaft 40, a second input shaft 42, a countershaft 44 that extends substantially parallel with first and second input shafts 40 and 42, and a plurality of gears which are arranged on and/or around shafts 40, 42 and 44. Although shafts 40, 42 and 44 are illustrated as being mounted in a common plane in FIG. 2, these shafts may be arranged in different planes.

In the embodiment shown in FIG. 2, first input shaft 40 is connectable to an output member 46 of the prime mover 22, such as a flywheel, through a first input gear 46A and a first main clutch C1 that is used to establish speed gearing for selected ratios, while second input shaft 42 is connectable to output member 46 through a second input gear 46B and a second main clutch C2 that is used for establishing speed gearing for selected ratios, as discussed in greater detail below. In an embodiment of the invention, first and second main clutches C1 and C2 are of a normally ON type, which assumes the ON (viz., engaged) state due to a biasing force of a spring and the like under a normal condition and establishes the OFF (viz., disengaged) state due to work of a hydraulic or electric actuator upon receiving a given instruction. Engagement and disengagement of first and second main clutches C1, C2 may function automatically under the control of ECU 30, and without intervention of a vehicle driver, when powertrain systems operates like an "automatic" transmission.

To first input shaft 40 there are connected a first speed input gear 48, a third speed input gear 50 and a fifth speed input gear 52, such that gears 48, 50, 52 rotate together with first input shaft 40. Similarly, to second input shaft 42 there are connected a sixth speed input gear 54, a reverse input gear 56, a second speed input gear 58 and a fourth speed input gear 60, such that gears 54, 56, 58 and 60 rotate together with second input shaft 42. The number of input gears provided on first and second input shafts 40, 42 is not limited to the number shown in FIG. 2, and may include more or less input gears depending on the number of ratios desired in the transmission. The term "gear," as stated herein, is used to define the toothed wheels schematically illustrated in FIG. 2, as well as manufacturing the toothed features of the wheels directly into first and second input shafts 40, 42 and countershaft 44.

To countershaft 44 there are rotatably connected a first speed output gear 62, a third speed output gear 64, a fifth speed output gear 66, a reverse output gear 68, a second speed output gear 70, a fourth speed output gear 72, and a sixth speed output gear 74. Thus, output gears 62-74 rotate around countershaft 44. Like input gears 48-60, the number of output gears provided on countershaft 44 is not limited to the number shown in FIG. 2.

Referring still to FIG. 2, first speed output gear 62, third speed output gear 64 and fifth speed output gear 66 are meshed with first speed input gear 48, third speed input gear 50 and fifth speed input gear 52, respectively. Similarly, reverse output gear 68, second speed output gear 70, and fourth speed output gear 72 and sixth speed output gear 74 are meshed with reverse input gear 56 (through an idler 76), second speed input gear 58, fourth speed input gear 60 and sixth speed input gear 54, respectively. In another embodiment, transmission 24 may include a second countershaft (not shown) that includes one or more of the output gears rotatably disposed on countershaft 44.

In the embodiment illustrated, the transmission 24 includes a range section 78, as discussed in greater detail below, although the countershaft 44 may be directly connected for supplying torque to the output member 32. The transmission 24 also includes axially moveable shift clutches, such as synchronized single or double acting dog-type clutches, which are splined to countershaft 44 for rotation therewith. Specifically, in the embodiment illustrated, the transmission includes a first shift clutch 82, a second shift clutch 84, a third shift clutch 86, and a fourth shift clutch 88. In the embodiment described herein, the shift clutches 82, 84, 86 and 88 are controlled by the ECU 30 acting through the shift control system 26.

When the transmission is in a first speed ratio configuration, the first main clutch C1 is engaged such that torque is transmitted from the first prime mover 22 to the first input shaft 40, the second main clutch C2 is disengaged such that generally no torque is transmitted from the first prime mover 22 to the second input shaft 42, and the shift clutch 84 is engaged with the first speed output gear 62 such torque is transmitted from the first input shaft 40 to the countershaft 44.

When the transmission is in a second speed ratio configuration, the first main clutch C1 is disengaged such that generally no torque is transmitted from the first prime mover 22 to the first input shaft 40, the second main clutch C2 is engaged such that torque is transmitted from the first prime mover 22 to the second input shaft 42, and the shift clutch 88 is engaged with the gear 70 such torque is transmitted from the second input shaft 42 to the countershaft 44.

When the transmission is in a third speed ratio configuration, the first main clutch C1 is engaged such that torque is transmitted from the first prime mover 22 to the first input shaft 40, the second main clutch C2 is disengaged such that generally no torque is transmitted from the first prime mover 22 to the second input shaft 42, and the shift clutch 86 is engaged with the gear 64 such torque is transmitted from the first input shaft 40 to the countershaft 44.

Configuring the transmission 24 into a fourth speed ratio configuration, a fifth speed ratio configuration, a sixth speed ratio configuration, and a reverse speed configuration is accomplished in similar fashion. The transmission 24 may be in a neutral configuration when either 1) the first main clutch C1 and the second main clutch C2 are disengaged, and/or 2) the shift clutches 82, 84, 86, 88 are disengaged. The shift control system 26 is in a neutral configuration when the shift clutches 82, 84, 86, 88 are disengaged.

Figure 3:
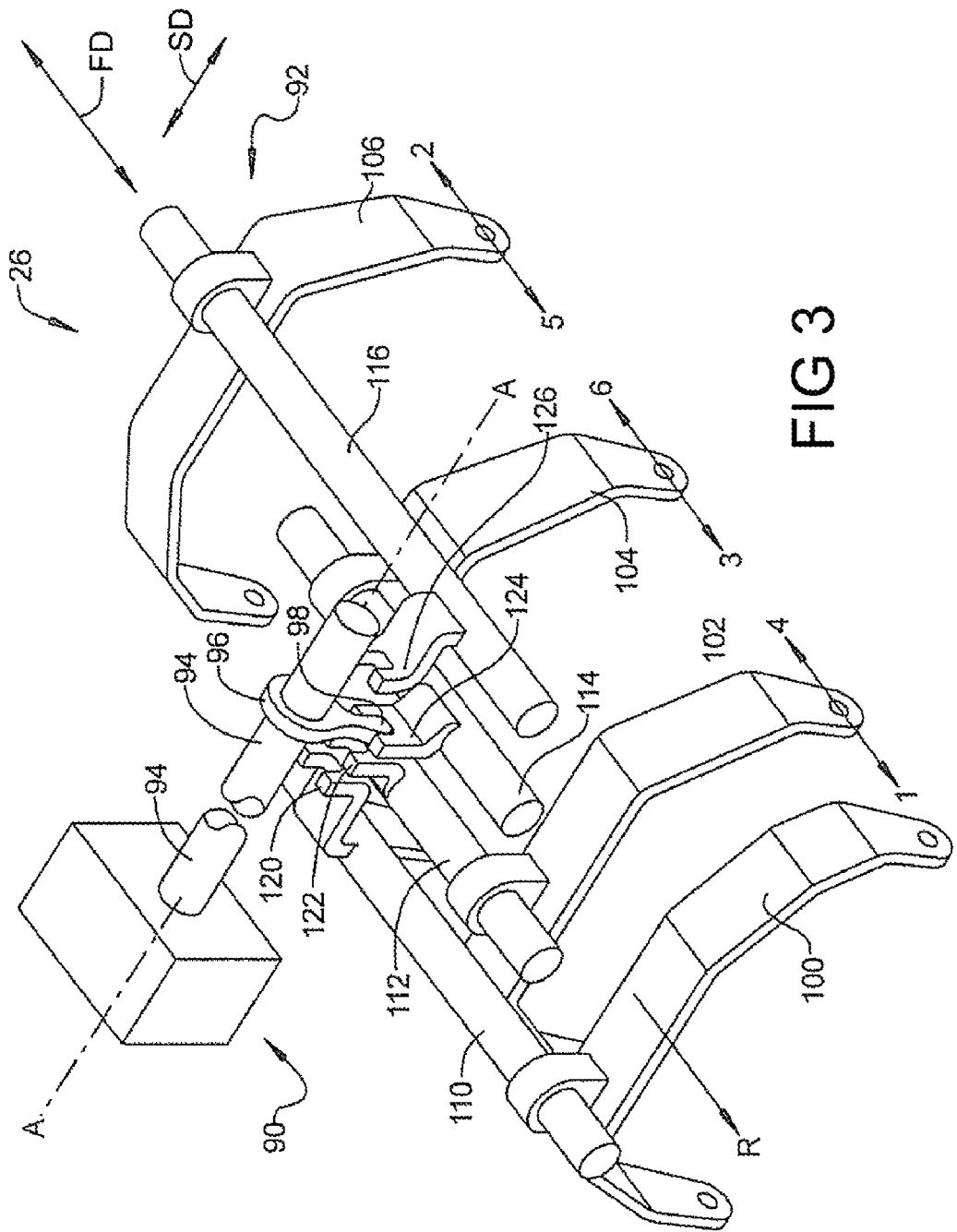
FIG. 3 is a schematic perspective illustration of a portion of a shift control device of the main section of the transmission of FIG. 1.

FIG. 3 illustrates the shift control system 26 to include an X-Y actuator 90 and a shift rail mechanism 92. Typical X-Y actuators are disclosed in U.S. Pat. Nos. 4,821,590, 4,873,881 5,281,902, and 6,227,067, the disclosures of which are hereby incorporated by reference. In the embodiment illustrated, the actuator 90 includes a shift shaft 94 generally defined by an axis A-A and a shift finger 96 having a shift finger engaging portion 98. The shift finger 96 extends from the shift shaft 94 to contact a plurality of shift members, commonly referred to as shift blocks or shift gates, as discussed below.

FIG. 3 also illustrates a portion of the transmission 24 that is moveable by the shift control system 26 to include a first shift fork 100, a second shift fork 102, a third shift fork 104, a fourth shift fork 106, a first shift shaft 110, a second shift shaft 112, a third shift shaft 114, a fourth shift shaft 116, a first shift member 120, a second shift member 122, a third shift member 124, and a fourth shift member 126. The first shift fork 100 is connected to the first shift shaft 110, which is connected to the first shift member 120. The second shift fork 102 is connected to the second shift shaft 112, which is connected to the second shift member 122. The third shift fork 104 is connected to the third shift shaft 114, which is connected to the third shift member 124. The fourth shift fork 106 is connected to the fourth shift shaft 116, which is connected to the fourth shift member 126.

Referring back to FIG. 2, the first shift clutch 82 is moveable by the first shift fork 100 in an axial direction toward main clutch assembly 28 to fix countershaft 44 for rotation with reverse output gear 68. Similarly, the second shift clutch 84 is moveable by the second shift fork 102 and may be moved in opposite axial directions to rotationally fix the fourth speed output gear 72 or the first speed output gear 62 to countershaft 44. The third shift clutch 86 is moveable by the third shift fork 104 and may be selectively moved in opposite axial directions to rotationally fix the third speed output gear 64 or the sixth speed output gear 74 to countershaft 44. The fourth shift clutch 88 is moveable by the fourth shift fork 108 and may be selectively moved in opposite axial directions to rotationally fix the fifth speed output gear 66 or the second speed output gear 70 to countershaft 44. In another embodiment of the invention, clutches 82, 84, 86 and 88 may also be provided on first and second input shafts 40, 42 to engage and disengage gears rotatably supported on input shafts 40, 42 in a manner substantially similar to the manner in which the gears are engaged on countershaft 44.

The ECU 30 delivers commands to the components of powertrain system 20 based on the receipt and evaluation of various input signals. These commands may include gear ratio interchange commands to the shift control system 26 that indirectly moves clutches 82, 84, 86, 88 to establish the gear ratios between first and second input shafts 40, 42 and countershaft 44.

The ECU 30 controls the axial position of each of clutches 82, 84, 86, 88, through a rail-type X-Y shift control mechanism, as discussed in greater detail below.

Operation of transmission 24 will now be described with reference to FIG. 2. In a first mode of operation employed during vehicle launch and acceleration, first and second main clutches C1 and C2 are initially disengaged and clutch 84 is moved leftward from the neutral position shown in FIG. 2, so that first speed output gear 62 is fixed to countershaft 44 by clutch 84. Upon this movement, power from the prime mover 22 may be transmitted to countershaft 44 by engaging first main clutch C1. The power applied to first input shaft 40 is transmitted through first speed input gear 48 to first speed output gear 62 to clutch 84 to countershaft 44 so that a first speed ratio is established in transmission 24.

As the vehicle accelerates and the second speed ratio is desired, clutch 88 is moved rightward from the neutral position shown in FIG. 2, so that second speed output gear 70 is fixed to countershaft 44 by clutch 88. The engagement of clutch 88 occurs while the second main clutch C2 is disengaged and therefore, power is not transmitted from the prime mover 22 to second input shaft 42. To engage the second speed ratio, the currently engaged first main clutch C1 is disengaged while simultaneously or nearly simultaneously engaging the second main clutch C2. The resulting power applied to second input shaft 42 is transmitted through second speed input gear 58 to countershaft 44 through second speed output gear 70 and clutch 88, so that the second speed ratio is established in transmission 24. This process is repeated in the same manner for up-shifting through the remaining gear ratios, and in a reverse manner for down-shifting from one gear ratio to another.

To achieve the reverse gear in transmission 24, first and second main clutches C1 and C2 are disengaged and clutch 82 is moved leftward from the neutral position shown in FIG. 2, so that reverse output gear 68 is fixed to countershaft 44 by clutch 82. The power applied to first input shaft 40 is transmitted from reverse input gear 56 to countershaft 44 through an idler gear 76 and reverse output gear 68.

Under a normal operating state, wherein transmission 24 is configured into a certain speed gearing, both the first main clutch C1 and the second main clutch C2 may be kept in their engaged conditions while one of clutches 82, 84, 86, and 88 is retained in a power transmitting position. For example, when transmission 24 assumes the fifth speed ratio, both first and second main clutches C1 and C2 may be engaged while clutch 88 is engaged with fifth speed output gear 66 and clutches 82, 84, and 86 are in their neutral position shown in FIG. 2. Although the first main clutch C1 and the second main clutch C2 are engaged, no power is transmitted through the unselected output gears 62, 64, 68, 70, 72, and 74 because these output gears are free to rotate relative to the countershaft 44 when not engaged by a corresponding clutch 82, 84, or 86.

As mentioned above, the illustrated embodiment of the transmission 24 includes the auxiliary transmission range section 78, as best seen in FIG. 2, although the methods and devices described herein may be used without a range section, or with a single clutch transmission. The range section 78 includes a synchronized two-position auxiliary section jaw clutch assembly 150, a range shaft 152, a first range shaft gear 154, a second range shaft gear 156, a first range gear 160, and a second range gear 162. The jaw clutch assembly 150 is axially positioned by means of a range shift fork (not shown), and rotatably fixed to countershaft 44 for rotation therewith. A range section shifting actuator assembly (not shown) is provided for engaging either countershaft 44 with output shaft 32 for direct or high range operation, or engaging countershaft 44 with gear 162 for low range operation of the transmission 24.

Briefly, and with reference to FIGS. 3-16, movement of the shift finger engaging portion 98 displaces a selected one of the forks and thereby engages a target gear. Specifically, ECU 30 controls the position of shift finger 96 as the shift finger 96 moves generally in a first generally orthogonal direction FD and generally in a second generally orthogonal direction SD. Generally, the first generally orthogonal direction FD is perpendicular to the second generally orthogonal direction SD, although either the first generally orthogonal direction FD and/or the second generally orthogonal direction SD may be slightly curved as the shift finger rotates generally about a portion of the shift control system 26, such as the axis A-A of the shift shaft 94. In the embodiment illustrated, the shift finger 96 moves in the first generally orthogonal direction FD as the shift shaft 94 rotates about the axis A-A. Additionally, the shift finger 96 moves in the second generally orthogonal direction SD as the shift shaft 94 translates along the axis A-A. Accordingly, the shift control system 26 includes a mechanism, such as the actuator 90, for rotating and translating the shift shaft 94. Alternatively, the shift finger may be manipulated by a shift control device that does not rotate a shaft, but translates the shift finger.

In the embodiment illustrated, the shift finger engaging portion 98 further includes a finger distal shift surface 180, a finger proximal shift surface 182, a finger first side surface 184, and a finger second side surface 186.

Figure 4:
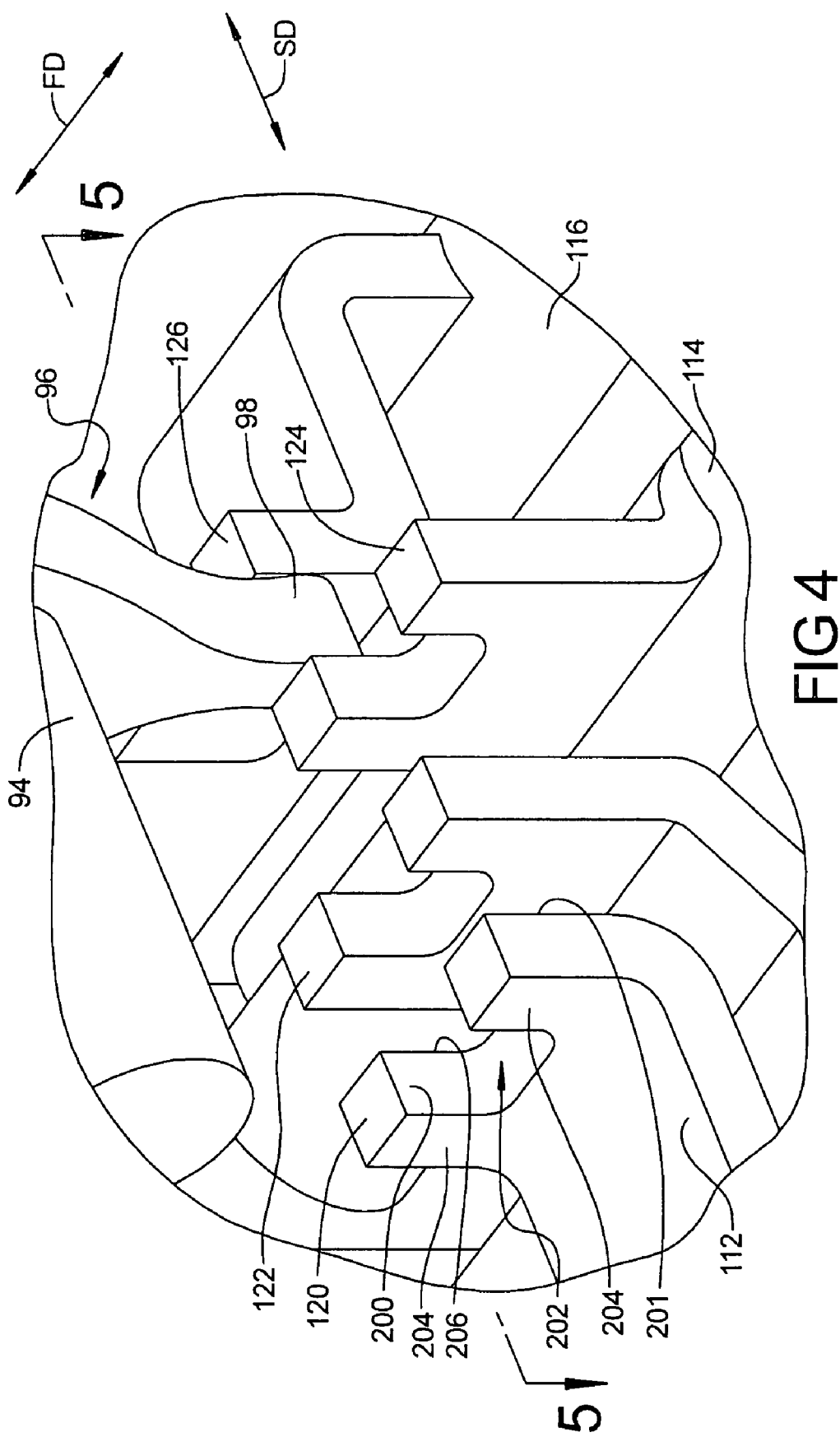
FIG. 4 is a perspective illustration of a portion of a shift control device of the main section of the transmission of FIG. 1.

As best illustrated in FIG. 4, the first shift member 120, second shift member 122, third shift member 124, and fourth shift member 126 each include opposing shift member engaging surfaces. Specifically, the first shift member 120 is defined by a first shift member distal surface 200, a first shift member proximal surface 202, a first shift member first side surface 204, and a first shift member second side surface 206.

The second shift member 122 is defined by a second shift member distal surface 210, a second shift member proximal surface 212, a second shift member first side surface 214, and a second shift member second side surface 216. The third shift member 124 is defined by a third shift member distal surface 220, a third shift member proximal surface 222, a third shift member first side surface 224, and a third shift member second side surface 226. Additionally, the fourth shift member 126 is defined by a fourth shift member distal surface 230, a fourth shift member proximal surface 232, a fourth shift member first side surface 234, and a fourth shift member second side surface 236.

Figure 15:
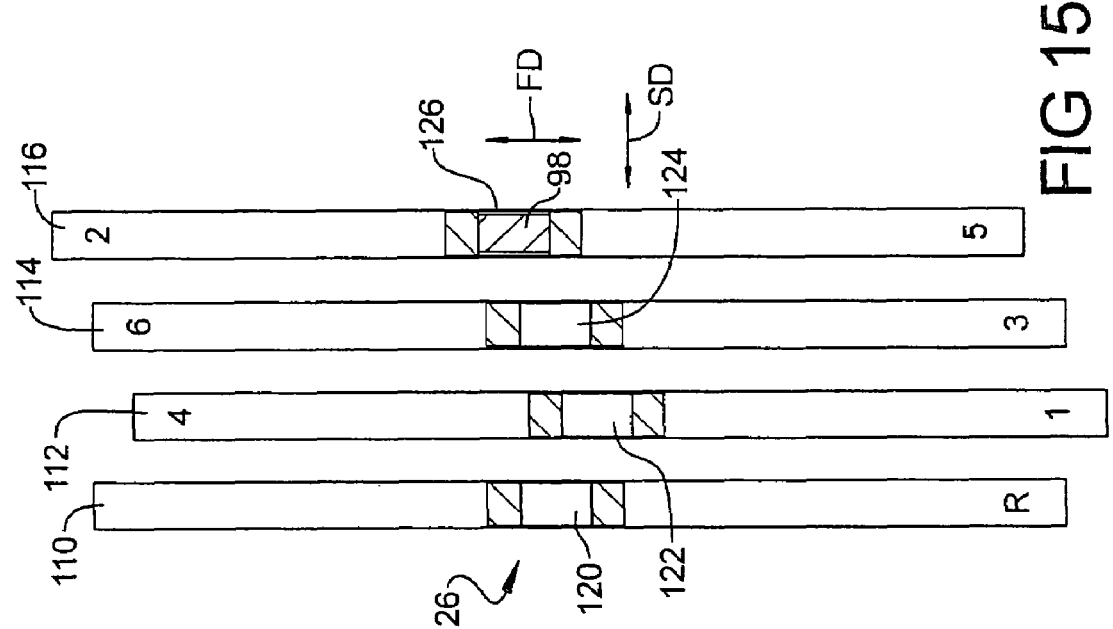

The shift finger engaging portion is limited for movement in the second generally orthogonal direction SD between a first lateral extent (FIG. 16) and a second lateral extent (FIGS. 14 and 15). The first shift member 120, the second shift member 122, the third shift member 124, and the fourth shift member 126 may be selectively aligned (as best seen in FIG.

6) such that the shift finger engaging portion 98 may move in the second generally orthogonal direction SD from the first lateral extent to the second lateral extent without moving the shift finger engaging portion 98 in the first lateral direction. Additionally, the shift finger engaging portion 98 may not be moved solely in the second generally orthogonal direction SD between the first lateral extent and the second lateral extent when the transmission is in an engaged speed ratio (FIGS. 3-5 and 8-15).

Figure 5:
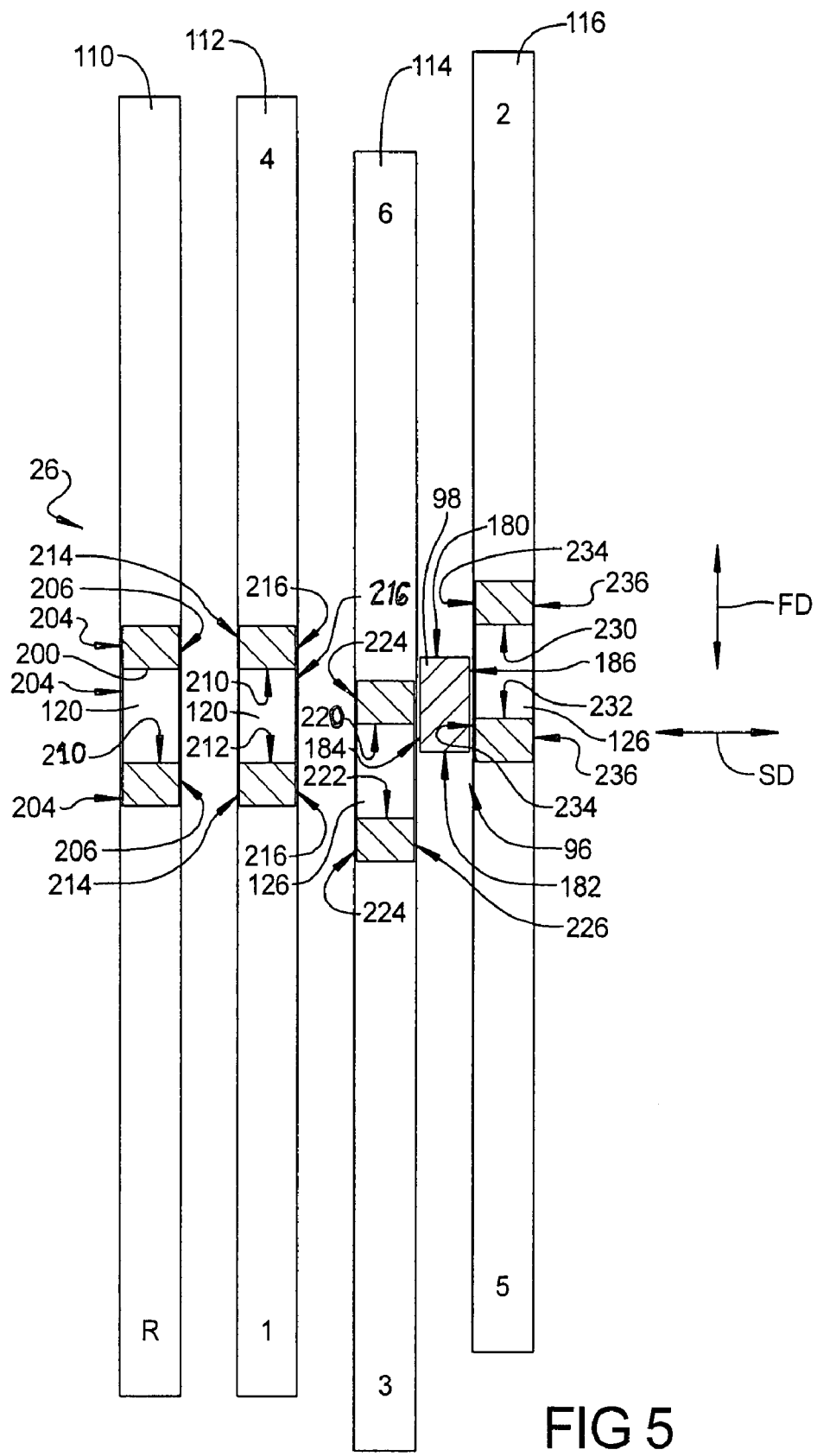
FIG. 5 is a view taken along line 5-5 of FIG. 4.

FIGS. 4 and 5 illustrate a portion of the shift control system 26 where both the third shift member and the fourth shift member are moved such that the shift clutch 86 is engaged with the gear 64 and the shift clutch 88 is engaged with the gear 70. In the configuration illustrated in FIGS. 4 and 5, the transmission 24 is in the second speed ratio configuration if the second main clutch C2 is engaged with the first main clutch C1 disengaged, and the transmission 24 is in the third speed ratio configuration if the first main clutch C1 is engaged with the second main clutch C2 disengaged.

As best seen in FIG. 5, the width of the shift finger engaging portion 98 in the generally orthogonal direction SD (between surfaces 184 and 186) is less than the width between adjacent shift members (such as shift members 120, 122) such that the shift finger engaging portion 98 may be interposed between two adjacent shift members.

With reference to FIGS. 6-15, the shifting of the transmission 24 will be described in greater detail in relation to the shift finger 96. FIG. 6 illustrates a neutral configuration for the shift control system 26 is in a neutral configuration where the shift members 120, 122, 124, 126 are aligned when viewed in the second generally orthogonal direction SD and the shift clutches 82, 84, 86, 88 are disengaged and will not transmit any appreciable amount of torque between the prime mover 22 and the output member 32.

Figure 16:
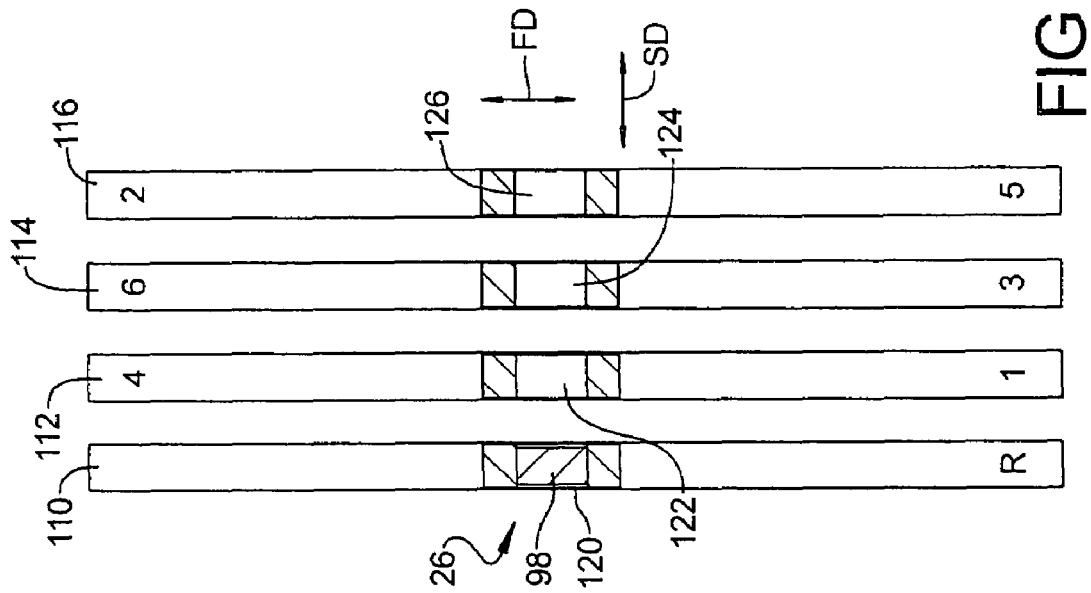

The shift finger 96 is in a first engaged configuration when the shift finger 96 may be moved in the first generally orthogonal direction FD such that the shift finger engaging portion 98 contacts the first shift member 120 (FIG. 16). The shift finger 96 is in a second engaged configuration when the shift finger 96 may be moved in the first generally orthogonal direction FD such that the shift finger engaging portion 98 contacts the second shift member 122 (FIGS. 7 and 8). The shift finger 96 is in a third engaged configuration when the shift finger 96 may be moved in the first generally orthogonal direction FD such that the shift finger engaging portion 98 contacts the third shift member 124 (FIGS. 3, 4, 11 and 12). The shift finger 96 is in a fourth engaged configuration when the shift finger 96 may be moved in the first generally orthogonal direction FD such that the shift finger engaging portion 98 contacts the fourth shift member 126 (FIGS. 13-15).

The shift finger is in an intermediate configuration when the shift finger engaging portion 98 may be moved in the first generally orthogonal direction FD such that the shift finger engaging portion 98 would not contact any shift member, such as shift members 120, 122, 124, 126 (FIGS. 5, 6, 9, and 10). In the intermediate configuration of FIGS. 5, 6, 9, and 10, the shift finger engaging portion 98 may be moved in the first generally orthogonal direction FD when interposed between adjacent shift members. As best seen in the specific configuration of FIG. 5, the shift finger engaging portion 98 is moved differing distances, depending upon the relative positions of the shift members 120, 122, 124, 126. That is, for example, the distance between the second shift member distal surface 210 and the third shift member distal surface 220 (measured in the first generally orthogonal direction FD) is a first shift distance, while the distance between the third shift member distal surface 220 and the fourth shift member distal surface 230 (measured in the first generally orthogonal direction FD) is a second shift distance.

Complementary to the discussion above describing the shifting of the transmission 24 from the neutral configuration to the first speed ratio configuration to the second speed ratio configuration, the following will present the concurrent movement of portions of the shift control system 26. With the shift control system 26 in the neutral configuration (schematically illustrated in FIGS. 6 and 7 and including all configurations where the shift members 120, 122, 124, 126 are aligned as in FIGS. 6 and 7), the transmission 24 is in the neutral configuration schematically illustrated in FIG. 2. The shift control system 26 is directed by the ECU 30 to shift the transmission into the first speed ratio configuration. Generally, upon startup of the prime mover 22, the ECU 30 will detect the position of clutches C1, C2, 82, 84, 86, and 88 to determine the transmission 24 and the shift control system 26 configuration.

The shift control system 26 moves the shift finger engaging portion 98 in the second generally orthogonal direction SD (if necessary) to the position illustrated in FIG. 7. Confirming that the first main clutch C1 is disengaged (which may be performed by the ECU 30), the shift control system 26 moves the shift finger engaging portion 98 in the first generally orthogonal direction FD (as the finger proximal shift surface 182 contacts the second shift member proximal surface 212) from the position illustrated in FIG. 7 to the position illustrated in FIG. 8 (a distance generally equal to the first shift distance) to place the transmission 24 and the shift control system 26 in the first speed ratio configuration, as the second shift clutch 84 engages the first speed output gear 62. The first main clutch C1 is then engaged to rotatably connect the output member 46 with the countershaft 44.

When a shift from the first speed ratio configuration to the second speed ratio configuration is desired, the ECU 30 will confirm that the clutches 82, 86, and 88 are not engaged and will direct the shift control system 26 to move the shift finger engaging portion 98 in the second generally orthogonal direction SD from the position of FIG. 8 to the intermediate configuration of FIG. 9, then move the shift finger engaging portion 98 in the first generally orthogonal direction FD, while remaining in the intermediate configuration, to the position schematically illustrated in FIG. 10 (a distance generally equal to about the first shift distance), then move the shift finger engaging portion 98 in the second generally orthogonal direction SD from the intermediate configuration of FIG. 10 to the fourth engaged configuration of FIG. 14, then move the shift finger engaging portion 98 in the first generally orthogonal direction FD such that the finger distal shift surface 180 of the shift finger engaging portion 98 contacts the fourth shift member distal surface 230 and the fourth shift clutch 88 is engaged with the second speed output gear 70 (FIG. 15). To shift from the first gear to the second gear, the first main clutch C1 is disengaged as the second main clutch C2 is engaged.

When a shift from the second speed ratio configuration to the third speed ratio configuration is desired, the ECU 30 will confirm that the clutches 82, 84, and 86 are not engaged and will direct the shift control system 26 to move the shift finger engaging portion 98 in the second generally orthogonal direction SD from the position of FIG. 15 (while not moving the fourth shift member 126) to an intermediate configuration where the shift finger engaging portion 98 is positioned between the third shift member 124 and the fourth shift member 126, then move the shift finger engaging portion 98 in the first generally orthogonal direction FD, while remaining in the intermediate configuration, to a position between the third shift member 124 and the fourth shift member 126 such that the shift finger engaging portion 98 may be moved in the first generally orthogonal direction FD and be interposed between the surfaces 220, 222 of the third shift member 124 (similar to FIG. 12). The shift finger engaging portion 98 is then moved in the second generally orthogonal direction SD while being at least partially interposed between the surfaces 220, 222 of the third shift member 124, to a position where the shift finger engaging portion 98 is positioned between the second shift member 122 and the third shift member 124 (similar to FIG. 10). The shift finger engaging portion 98 is then moved in the first generally orthogonal direction FD from the intermediate configuration (generally of FIG. 10) to a position generally illustrated in FIG. 9, where the shift finger engaging portion 98 may be moved in the second generally orthogonal direction SD and be interposed between the surfaces 210, 212 of the second shift member 122 (similar to FIG. 8). The shift finger engaging portion 98 is then moved in the second generally orthogonal direction SD and interposed between the surfaces 210, 212 of the second shift member 122 (into the second engaged configuration). The shift finger engaging portion 98 is then moved in the first generally orthogonal direction FD about a distance equal to the first shift distance, such that the finger distal shift surface 180 of the shift finger engaging portion 98 contacts the second shift member distal surface 210, moving the second shift member 122 to about the position of FIG. 7, and the shift clutch 84 is disengaged with the first speed output gear 62 (thereby disengaging the first gear). The shift finger engaging portion 98 is then moved in the second generally orthogonal direction SD from the second engaged configuration to the third engaged configuration (while not moving the second shift member 122) through an intermediate configuration where the shift finger engaging portion 98 is positioned between the second shift member 122 and the third shift member 124. That is, the shift finger engaging portion 98 is moved from a position where the shift finger engaging portion 98 is interposed between the surfaces 210, 212 of the second shift member 122 to a position where the shift finger engaging portion 98 interposed between the surfaces 220, 222 of the third shift member 124. The shift finger engaging portion 98 is then moved in the first generally orthogonal direction FD about a distance equal to the first shift distance, such that the finger proximal shift surface 182 of the shift finger engaging portion 98 contacts the third shift member proximal surface 222, moving the third shift member 124 to a position (illustrated generally in FIG. 5) where the third shift clutch 86 is engaged with the third speed output gear 64 (thereby engaging the third gear). To shift from the second gear to the third gear, the second main clutch C2 is disengaged as the first main clutch C1 is engaged.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A shift apparatus for a multispeed transmission, wherein the multispeed transmission includes multiple gear groups having alternating speed ratios, the apparatus comprising:
   a first shift member connected to a first shift shaft;
   a second shift member connected to a second shift shaft, wherein the first shift member and the second shift member are selectively moveable for engaging a speed ratio of the transmission; and
   a single shift finger for engaging at least a portion of one of the shift members, wherein the shift finger is moveable generally in a first generally orthogonal direction to engage the first shift member when in a first engaged configuration, the shift finger is moveable generally in the first generally orthogonal direction to engage the second shift member when in a second engaged configuration, the shift finger, when in an intermediate configuration, is moveable generally in the first generally orthogonal direction such that the shift finger cannot contact one of the shift members, and wherein the shift finger is selectively moveable generally in a second generally orthogonal direction between the first engaged configuration, the intermediate configuration, and the second engaged configuration,
   wherein the single shift finger, when engaged with the second shift member, is configured to move the second shift shaft in opposite axial directions to engage a target gear.

2. The apparatus of claim 1, wherein the first shift member is defined by a first shift member first side surface, a first shift member second side surface, a first shift member distal surface, and a first shift member proximal surface, the first shift member distal surface and the first shift member proximal surface intersect each of the first shift member first side surface and the first shift member second side surface, the shift finger selectively contacts the first shift member distal surface and the first shift member proximal surface when moved generally in the first generally orthogonal direction for engaging a transmission speed ratio, and wherein the shift finger may be selectively moved relative to the first shift member such that at least a portion of the shift finger faces the first shift member first side surface.

3. The apparatus of claim 2, wherein the second shift member is defined by a second shift member first side surface, a second shift member second side surface, a second shift member distal surface, and a second shift member proximal surface, the second shift member distal surface and the second shift member proximal surface intersect each of the second shift member first side surface and the second shift member second side surface, the shift finger selectively contacts the second shift member distal surface and the second shift member proximal surface when moved generally in the first generally orthogonal direction for engaging a transmission speed ratio, and wherein the shift finger may be selectively moved relative to the second shift member such that at least a portion of the shift finger is interposed between the first shift member second side surface and the second shift member first side surface second.

4. The apparatus of claim 1, wherein a width between the first shift member and the second shift member is greater than the width of the shift finger such that the shift finger may be interposed between adjacent shift members.

5. The apparatus of claim 1, wherein the shift finger may be moved generally in the first generally orthogonal direction between adjacent shift members.

6. The apparatus of claim 1, wherein the shift finger includes a shift finger engaging portion for contacting at least one of the shift members.

7. The apparatus of claim 6, wherein the shift finger engaging portion is limited for movement generally in the second generally orthogonal direction between a first lateral extent and a second lateral extent, and wherein the shift finger may not be moved solely generally in the second generally orthogonal direction from the first lateral extent to the second lateral extent when the transmission is in an engaged speed ratio.

8. The apparatus of claim 7, further comprising a third shift member, wherein the shift finger engaging portion selectively contacts each of the first shift member, the second shift member, and the third shift member for engaging a speed ratio.

9. A method for shifting a multispeed transmission of a vehicle, wherein the multispeed transmission includes multiple gear groups having alternating speed ratios, the method comprising:
   directing a single shift finger to contact a distal surface and a proximal surface of a first shift member;
   moving the first shift member generally in a first generally orthogonal direction to engage a first gear ratio;
   moving the shift finger in a second generally orthogonal direction to an intermediate configuration, wherein the shift finger will not contact a shift member when moved generally in the first generally orthogonal direction when the shift finger is in the intermediate configuration;
   moving the shift finger generally in the first generally orthogonal direction while the shift finger is in the intermediate configuration; and
   moving the shift finger generally in the second generally orthogonal direction to an engaged configuration, wherein the shift finger will contact a selector rail when moved generally in the first generally orthogonal direction when the shift finger is in the engaged configuration.

10. The method of claim 9, wherein moving the first shift member in a first generally orthogonal direction to engage a first gear ratio includes engaging a shift clutch.

11. The method of claim 9, wherein moving the shift finger generally in the first generally orthogonal direction while the shift finger is in the intermediate configuration is performed between each engagement of a speed ratio.

12. The method of claim 9, wherein moving the shift finger generally in the first generally orthogonal direction while the shift finger is in the intermediate configuration is selectively performed when a speed ratio is engaged.

13. The method of claim 9, wherein moving the shift finger generally in the first generally orthogonal direction while the shift finger is in the intermediate configuration includes moving the shift finger between adjacent shift members.

14. A method for shifting a multispeed transmission, wherein the multispeed transmission includes multiple gear groups having alternating speed ratios and a plurality of shift members, wherein each shift member is selectively moveable to engage a speed ratio of the transmission, the method comprising:
   directing a single shift finger to contact a distal surface and a proximal surface of a first shift member, thereafter;
   moving the first shift member generally in a first generally orthogonal direction to engage a first gear, thereafter;
   moving the shift finger in a second generally orthogonal direction to an intermediate configuration, wherein the shift finger will not contact a shift member when moved generally in the first direction when the shift finger is in the intermediate configuration, thereafter;
   moving the shift finger generally in the second generally orthogonal direction to a second engaged configuration, wherein the shift finger will contact a second shift member when moved generally in the first direction when the shift finger is generally in the second engaged configuration.

15. The method of claim 14, further comprising moving the shift finger generally in the first generally orthogonal direction while the shift finger is in the intermediate configuration.

16. The method of claim 14, wherein at least a portion of one of the shift members is moveable to between a plurality of engaged configurations and intermediate configurations such that at least a portion of one of the shift members may be moved generally in the first generally orthogonal direction when the shift finger is in any of the engaged configurations and intermediate configurations.

17. The method of claim 14, wherein a width between the first shift member and the second shift member is greater than the width of the shift finger such that the shift finger may be interposed between adjacent shift members.

18. A shift apparatus for a multispeed transmission, wherein the multispeed transmission includes multiple gear groups having alternating speed ratios, the apparatus comprising:
   a first shift member;
   a second shift member, wherein the first shift member and the second shift member are selectively moveable for engaging a speed ratio of the transmission; and
   a shift finger for engaging at least a portion of one of the shift members, wherein the shift finger is moveable generally in a first generally orthogonal direction to engage the first shift member when in a first engaged configuration, the shift finger is moveable generally in the first generally orthogonal direction to engage the second shift member when in a second engaged configuration, the shift finger, when in an intermediate configuration, is moveable generally in the first generally orthogonal direction such that the shift finger cannot contact one of the shift members, and wherein the shift finger is selectively moveable generally in a second generally orthogonal direction between the first engaged configuration, the intermediate configuration, and the second engaged configuration,
   wherein the first shift member is moveable generally in the first generally orthogonal direction between a first shift member distal gear engagement and a first shift member proximal gear engagement to define a shift distance, and wherein the shift finger is moveable generally in the first generally orthogonal direction at least the length of the shift distance without contacting a shift member.

* * * * *